United States Patent
Hoey

(10) Patent No.: US 10,294,968 B2
(45) Date of Patent: May 21, 2019

(54) ARTICLE RETAINING DEVICE AND METHOD OF ATTACHMENT

(71) Applicant: Thomas Joseph Hoey, Lockport, IL (US)

(72) Inventor: Thomas Joseph Hoey, Lockport, IL (US)

(*) Notice: Subject to any disclaimer, the term of this patent is extended or adjusted under 35 U.S.C. 154(b) by 0 days.

(21) Appl. No.: 15/789,976

(22) Filed: Oct. 21, 2017

(65) Prior Publication Data
US 2018/0112692 A1    Apr. 26, 2018

Related U.S. Application Data

(60) Provisional application No. 62/496,527, filed on Oct. 21, 2016.

(51) Int. Cl.
| | |
|---|---|
| *F16B 2/08* | (2006.01) |
| *A45F 5/02* | (2006.01) |
| *F16M 13/02* | (2006.01) |
| *B60R 11/02* | (2006.01) |

(52) U.S. Cl.
CPC ............ *F16B 2/08* (2013.01); *A45F 5/021* (2013.01); *F16M 13/022* (2013.01); *A45F 2200/0508* (2013.01); *A45F 2200/0516* (2013.01); *A45F 2200/0525* (2013.01); *A45F 2200/0583* (2013.01); *B60R 11/02* (2013.01)

(58) Field of Classification Search
CPC .... F16B 2/08; A45F 5/021; A45F 2200/0508; A45F 2200/0516; A45F 2200/0525; A45F 2200/0583; F16M 13/022; B60R 11/02
USPC ........... 248/309.1, 316.1, 315; 24/68 R, 300, 24/301, 302
See application file for complete search history.

(56) References Cited

U.S. PATENT DOCUMENTS

| | | | | |
|---|---|---|---|---|
| 141,579 | A | * | 8/1873 | Mehu ............... F16G 11/00 403/209 |
| 745,251 | A | | 11/1903 | Sleght |
| 881,462 | A | * | 3/1908 | Craig ............... A44B 11/22 24/176 |
| 904,843 | A | * | 11/1908 | Cooper ............... A01K 1/04 24/129 R |
| 1,270,207 | A | | 6/1918 | Preston |
| 1,277,483 | A | | 9/1918 | Rogers |
| 1,490,066 | A | * | 4/1924 | Legatee ............... A45F 3/14 182/3 |
| 2,327,683 | A | | 6/1942 | Warner et al. |
| 2,706,041 | A | * | 4/1955 | Tate ............... B65D 73/0042 206/303 |
| 3,672,004 | A | * | 6/1972 | Smith ............... B60P 7/0823 2/323 |
| 3,675,276 | A | * | 7/1972 | Nuse ............... A01K 91/04 24/129 B |
| 3,949,915 | A | | 4/1976 | Burhans |
| 4,328,605 | A | | 5/1982 | Hutchison et al. |
| 4,553,292 | A | | 11/1985 | Pradier et al. |
| 4,622,723 | A | | 11/1986 | Krauss |
| 4,675,948 | A | | 1/1987 | Bengtsson |

(Continued)

*Primary Examiner* — Nkeisha Smith
(74) *Attorney, Agent, or Firm* — Erickson Law Group, PC

(57) ABSTRACT

An article retaining device having a first loop that can be elongated, a hook, an elastic second loop, and an elastic third loop. The hook joined to the first loop. The elastic second loop is joined to the first loop and to the hook. The elastic third loop joined to the first loop. The first, second, and third loops may be arranged around an article.

15 Claims, 9 Drawing Sheets

(56) References Cited

U.S. PATENT DOCUMENTS

| | | |
|---|---|---|
| 5,657,557 A | 8/1997 | Hull et al. |
| 5,697,128 A | 12/1997 | Peregrine |
| 5,956,812 A | 9/1999 | Moennig |
| 6,038,745 A * | 3/2000 | Rapp .................. A45F 3/14 |
| | | 24/165 |
| 6,056,173 A | 5/2000 | Gillespie |
| 6,427,374 B1 | 8/2002 | Vaiani |
| 6,662,986 B2 * | 12/2003 | Lehtonen ................ A45F 5/02 |
| | | 224/222 |
| 6,692,986 B1 | 2/2004 | Bayer et al. |
| 6,868,589 B2 * | 3/2005 | Borne .................. H02G 11/00 |
| | | 24/298 |
| 6,932,309 B1 * | 8/2005 | Corey ................ B60R 11/0241 |
| | | 224/483 |
| 8,002,095 B2 | 8/2011 | Godshaw et al. |
| 8,714,422 B2 | 5/2014 | Yu |
| 8,807,505 B2 * | 8/2014 | Lotz .................... A45F 5/00 |
| | | 224/250 |
| 9,060,588 B2 * | 6/2015 | Bransfield ................ A45F 5/02 |
| 2002/0104861 A1 | 8/2002 | Kerjean |
| 2004/0069823 A1 * | 4/2004 | Condiff .................... A45F 5/00 |
| | | 224/269 |
| 2005/0001137 A1 * | 1/2005 | Geros ................ B60R 11/0252 |
| | | 248/610 |
| 2005/0173477 A1 | 8/2005 | Scott |
| 2006/0186150 A1 | 8/2006 | Willows et al. |
| 2007/0090254 A1 * | 4/2007 | Del Frari ................ F16M 11/40 |
| | | 248/309.1 |
| 2007/0120038 A1 * | 5/2007 | Wang .................... A45C 13/30 |
| | | 248/690 |
| 2007/0278265 A1 | 12/2007 | Contente |
| 2010/0243845 A1 * | 9/2010 | Lepine .................... B25H 3/00 |
| | | 248/315 |
| 2010/0288900 A1 * | 11/2010 | Janik .................... B60R 11/0241 |
| | | 248/315 |
| 2012/0200102 A1 | 8/2012 | McMeans |
| 2015/0237994 A1 | 8/2015 | Eromaki |
| 2015/0249730 A1 * | 9/2015 | Larsen ................ G03B 17/561 |
| | | 29/428 |
| 2018/0132600 A1 * | 5/2018 | Moreau .................... B25F 5/02 |

\* cited by examiner

US 10,294,968 B2

ARTICLE RETAINING DEVICE AND METHOD OF ATTACHMENT

This application claims the benefit of U.S. Patent Application No. 62/496,527, filed Oct. 21, 2016, which is herein incorporated by reference.

FIELD OF THE INVENTION

The present invention relates to an article retaining device and method of attachment.

BACKGROUND

There are various devices and methods for carrying and holding articles. However, the present inventor recognized the need for a device that will securely hold an article at a stationary location or when the article is being transported. The present inventor recognized the need for a device that will elastically grip the article at multiple locations of the article. The present inventor recognized the need for a device that is compact and easy to deploy, carry, and store. The present inventor recognized the need for a device that is capable of being adjusted to carry or hold articles of different shapes and sizes. The present inventor recognized the need for a device that uses loop-to-loop connections. The present inventor recognized the need for a device that is quickly releasable from the article.

SUMMARY

An article retaining device is disclosed. In some embodiments, the device has a first loop that can be elongated, a hook, an elastic second loop, and an elastic third loop. The hook is joined to the first loop. The elastic second loop is joined to the first loop and to the hook. The elastic third loop is joined to the first loop.

In some embodiments, a portion of the second loop extends through a loop opening of the first loop from a backside to a face side of the first loop to form the first loop-to-loop connection. And a portion of the third loop extends through the loop opening of the first loop from the face side to the backside of the first loop to form the second loop-to-loop connection.

A method of attaching or connecting an article is disclosed. In some embodiments, an elastic second loop is joined to an elongated first loop. An elastic third loop is joined to the first loop. A hook is joined to the first and second loops. An article is placed within the first loop. The second loop is stretched around the article. The third loop is stretched around the article. The hook is connected to an external object to join the article to the external object.

Numerous other advantages and features of the present invention will become readily apparent from the following detailed description of the invention and the embodiments thereof, from the claims, and from the accompanying drawings.

DETAILED DESCRIPTION OF THE EMBODIMENTS

The following description is presented to enable any person skilled in the art to make and use the invention. For the purposes of explanation, specific nomenclature used provides a plural understanding of the present invention. While this invention is susceptible of embodiment in many different forms, the drawings and this description demonstrate specific embodiments of the invention with the understanding that the present disclosure is to be considered as an exemplification of the principles of the invention and is not intended to limit the invention to the specific embodiments illustrated.

Figure 1:
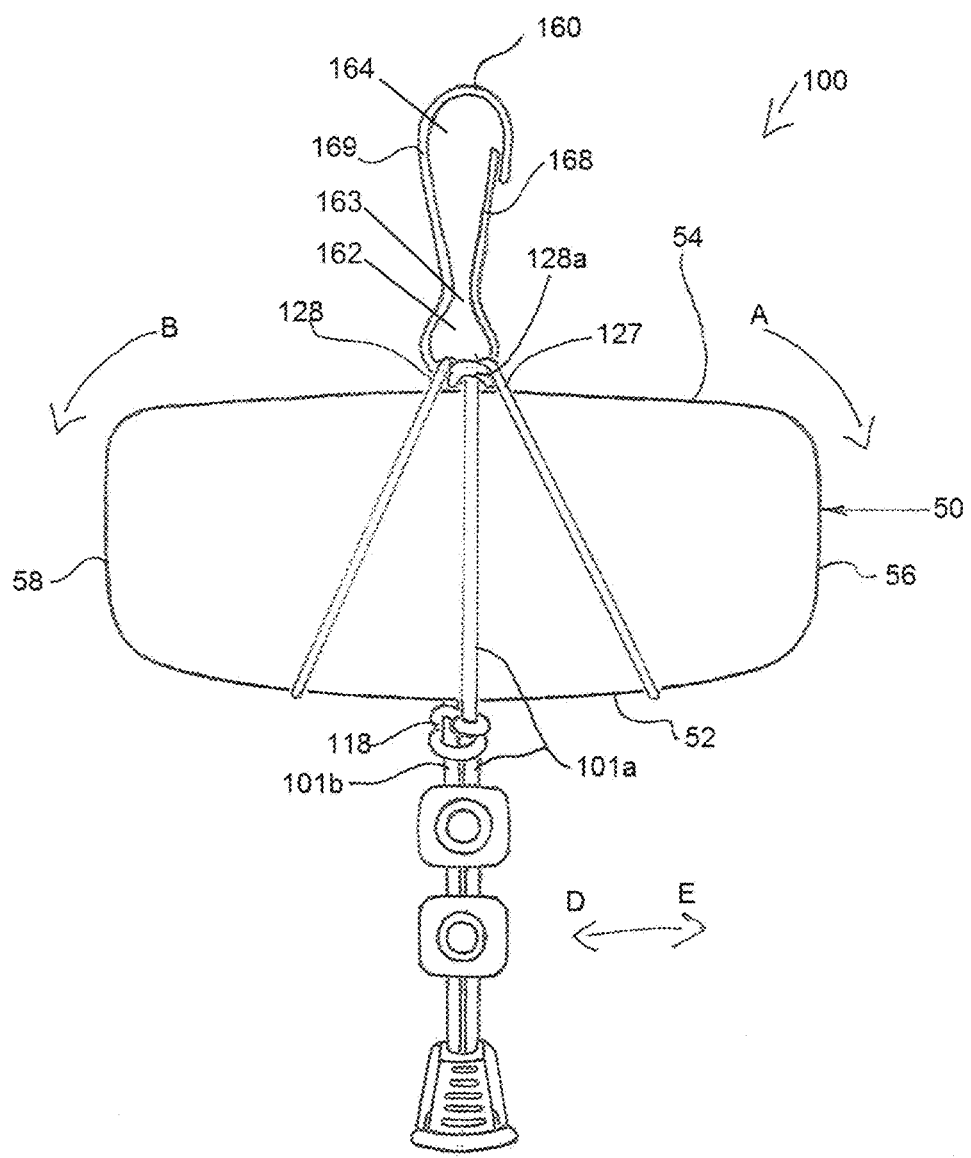
FIG. 1 is a front view of an embodiment of an article retaining device of the invention deployed about an article.

FIG. 1 shows an embodiment of the article retaining device 100 deployed about an article 50, such as a phone or portable electronic device.

Figure 2:
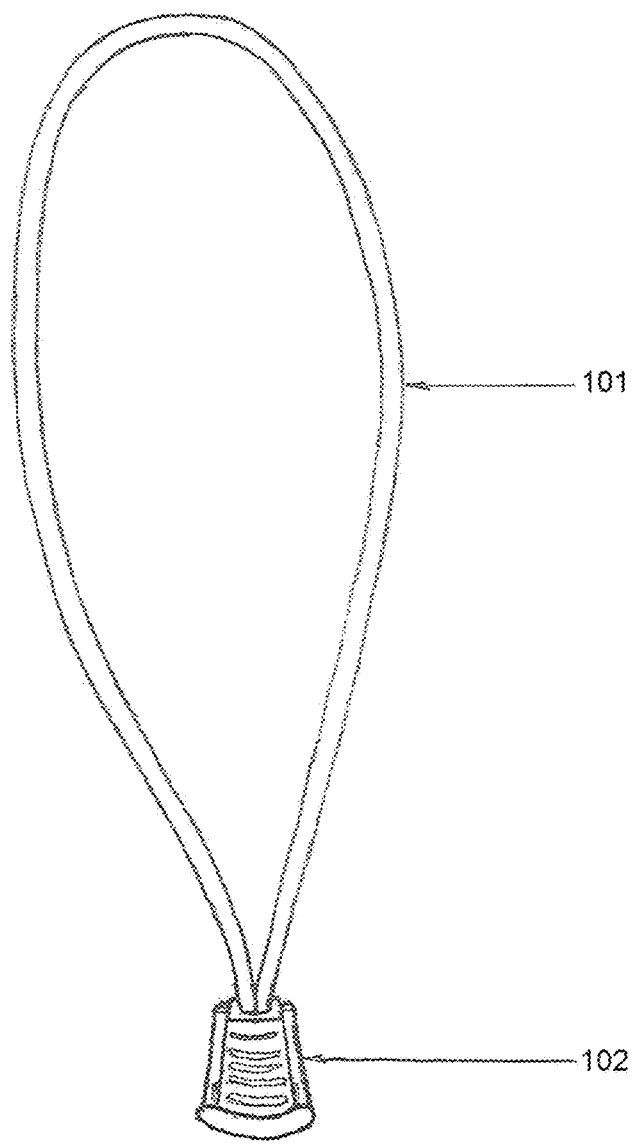
FIG. 2 is a front view of a cord of the device of FIG. 1.

FIG. 2 shows a cord 101 of the device 100. The cord 101 is a flexible cord segment that is looped back on itself so that the beginning and the end of the cord segment are adjacent to each other. The beginning and end of the cord segment are joined by a clamping or crimping mechanism 102. The cord 101 forms a first loop as shown in FIG. 1. Other clamping or joining mechanisms, means, or methods may be used to form a loop from the cord. Further, the cord may be originally formed as an integral loop without the need of a joining mechanism. In some embodiments, the cord is elastic.

The cord loop may be elongated. The proximal end of the loop is at the clamping mechanism 102. Opposite of the clamping mechanism 102 is a distal end 103. The loop end 103 and the mechanism may divide the loop into two cord portions 101a, 101b. In some arrangements, the loop may be elongated to the extent that opposite portions 101a, 101b of the cord are parallel to each other or substantially parallel to each other. The opposite portions 101a, 101b may be equal or substantially equal in length.

Figure 3:
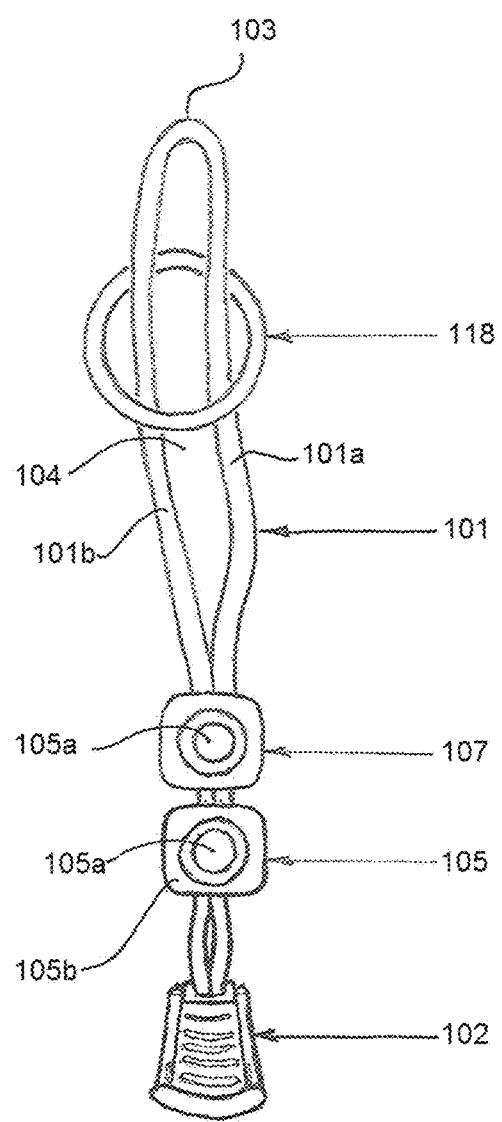
FIG. 3 is a front view of a portion of the device of FIG. 1 in a stage of assembly.
Figure 9:
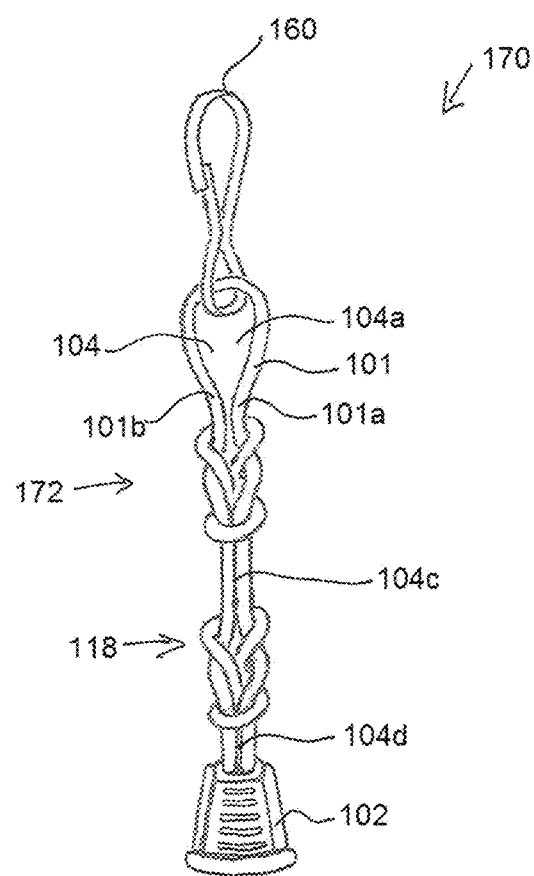
FIG. 9 is a front view of a second embodiment article retaining device.

As shown in FIG. 3, two stop mechanisms 105, 107 may be provided along the cord portions 101a, 101b. In some embodiments, the device 100 comprises one, two or more stop mechanisms. An exemplary stop mechanism is shown in FIG. 9. The stop mechanism comprises a button 105a and a body 105b. The body 105b comprises a button cavity 105c and a first cord passage 105d and a second cord passage 105e. The button 105a is received in the button cavity 105c. The button comprises a button cord passage 105i.

The button 105a is biased to a raised position by a spring 105f. The spring is located between the housing floor 105g and the bottom 105h of the button 105a. The button can be pressed down by the user, overcoming the spring bias, so that the first and second cord passages 105d, 105e and the button cord passage 105i, are aligned, substantially aligned or aligned to a passing extent. Therefore, the cord 101 and/or cord portions 101a, 101b can move relative to the stop mechanism or the stop mechanism can move relative to the cord 101 and/or cord portions 101a, 101b, or both. When the passages 105d, 105e, 105i are aligned to a passing extent, the passages may not be completely aligned, but they are aligned sufficient to allow movement of the stop mechanism relative to the cord 101 and/or vice versa.

When the first and second cord passages 105d, 105e and the button cord passage 105i, are aligned, substantially aligned or aligned to a passing extend, then the stop device is in an open position. When the button is released, the spring will bias the button cord passage 105i out of alignment with the first and second passages 105d, 105e. This will cause the cord to be frictionally trapped between the bottom of the button passage and the top of the first and second passages. The frictional trapping stops or substantially prevents the movement of the stop mechanism relative to the cord 101 and vice versa.

The stop mechanisms 105, 107 can be placed along the cord to adjust the size of the opening 104 of the cord 101. By adjusting the opening 104, the device can be adjusted to accommodate different sized articles placed in the opening 104.

Figure 4:
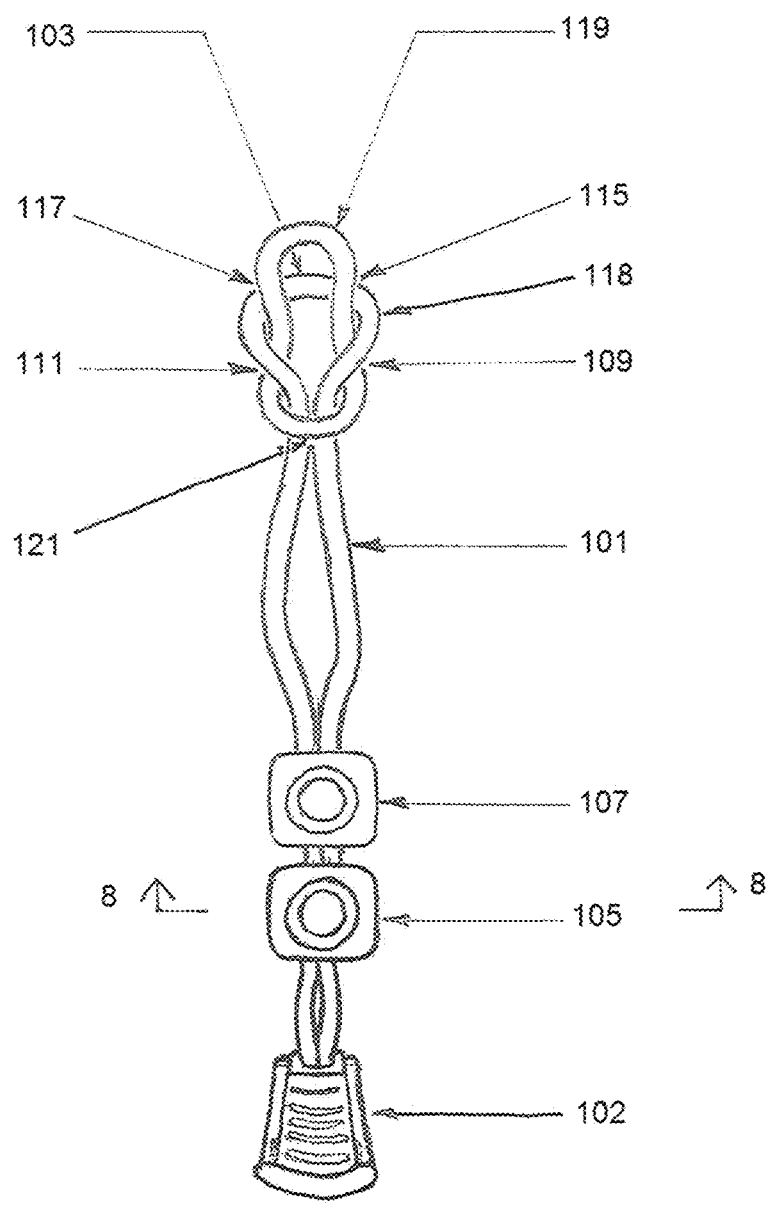
FIG. 4 is a front view of a portion of the device of FIG. 1 in a stage of assembly.

As shown in FIG. 3, the end 103 is passed into and through a center of a fourth elastic loop 118. A loop-to-loop connection is made between cord 101 and loop 118. As shown in FIG. 4, a distal end 119 of the elastic loop 118 has been pulled through a portion of the opening 104 in cord 101 so that the distal end 119 extends beyond the end 103. Doing so causes the end 103 to rest across a portion of the elastic loop 118. This creates a first set of crossing locations 109, 111 and a second set of crossing locations 115, 117 between the portions of the elastic loop 118 and the cord 101. Drawing the cord 101 and the loop 118 in opposite directions causes the loop-to-loop connection to tighten. The proximal end 121 of the elastic loop 118 causes the portions 101a, 101b to be drawn close or in contact with each other at or adjacent the proximal end 121.

Figure 5:
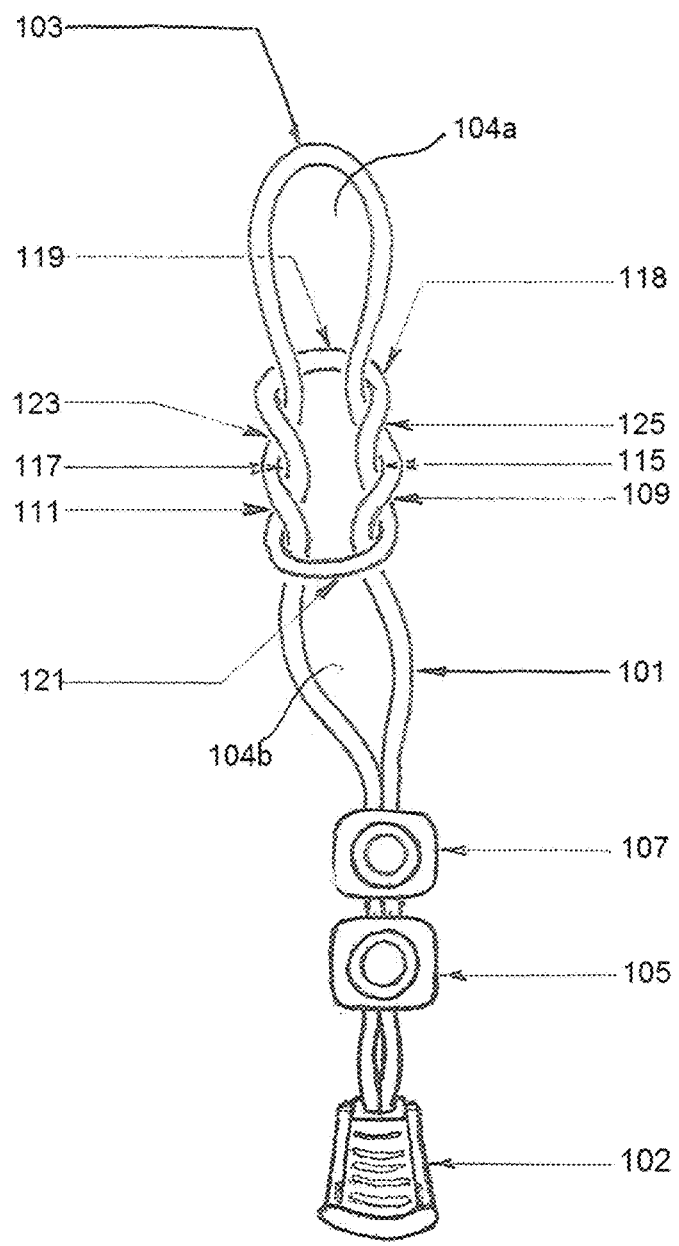
FIG. 5 is a front view of a portion of the device of FIG. 1 in a stage of assembly.

FIG. 5 shows the elastic loop 118 has been moved or placed further along the cord 101 toward the clamping mechanism 102 as compared to the location in FIG. 4. This creates a larger end loop opening 104a as compared to FIG. 4. The loop-to-loop connection can provide openings 104a, 104b in each cord/loop 101, 118 at opposite end/end areas 103, at 107, while ends 119, 121 bear on the segments of the opposite cord/loop as shown in FIG. 5.

Figure 6:
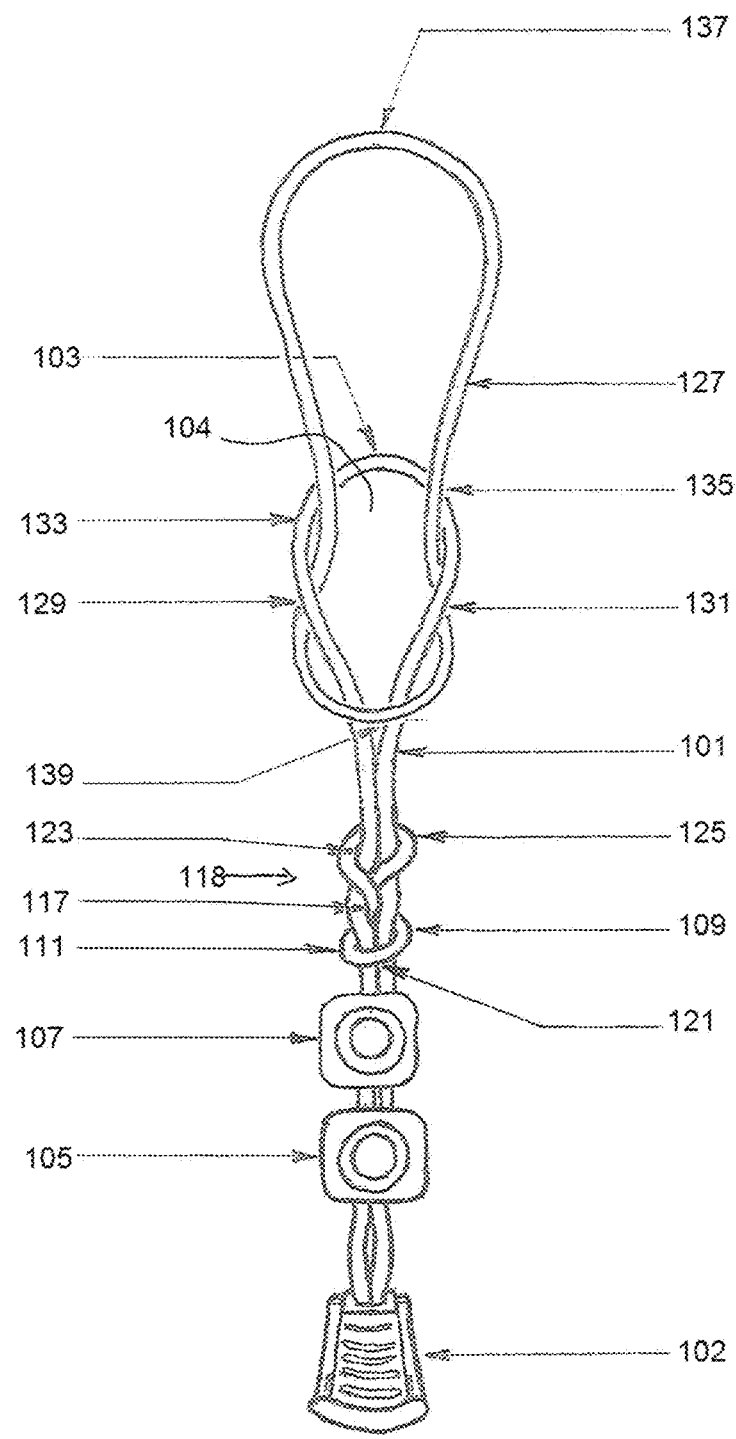
FIG. 6 is a front view of a portion of the device of FIG. 1 in a stage of assembly.

FIG. 6 shows the elastic loop 118 moved or placed even further along cord 101 toward the clamping mechanism 102 as compared to the location in FIG. 4 or FIG. 5. The loop 118 is on the distal side of stop mechanism 107. The loop 118 can act as a friction agent to further assist in preventing the movement of the stop mechanism 107 in the proximal direction toward the clamp mechanism 102 or in the opposite direction. The loop 118 can further act as a friction agent against the article 50 to assist in preventing the article 50 from becoming dislodged from the device 100. This may be particularly helpful when the article is transported, such as via attachment to belt, waist, garment, back pack loop, vehicle, or the like.

FIG. 6 shows the device comprising a second elastic loop 127. A loop-to-loop connection is made between cord 101 and loop 127. Loop 127 has a distal end 137 and a proximal end 139. The end 103 of the cord 101 is passed into and through a center or opening of an elastic loop 127. A distal end 137 of the elastic loop 127 has been pulled through a portion of the opening 104 in cord 101 so that the distal end 137 extends beyond the end 103. Doing so causes the end 103 to rest across a portion of the elastic loop 127. This creates a first set of crossing locations 129, 131 and a second set of crossing locations 133, 135 between the portions of the elastic loop 127 and the cord 101. In some embodiments, the proximal end 139 of the elastic loop 127 causes the portions 101a, 101b to be drawn close or in contact with each other at or adjacent the proximal end 139.

Figure 7:
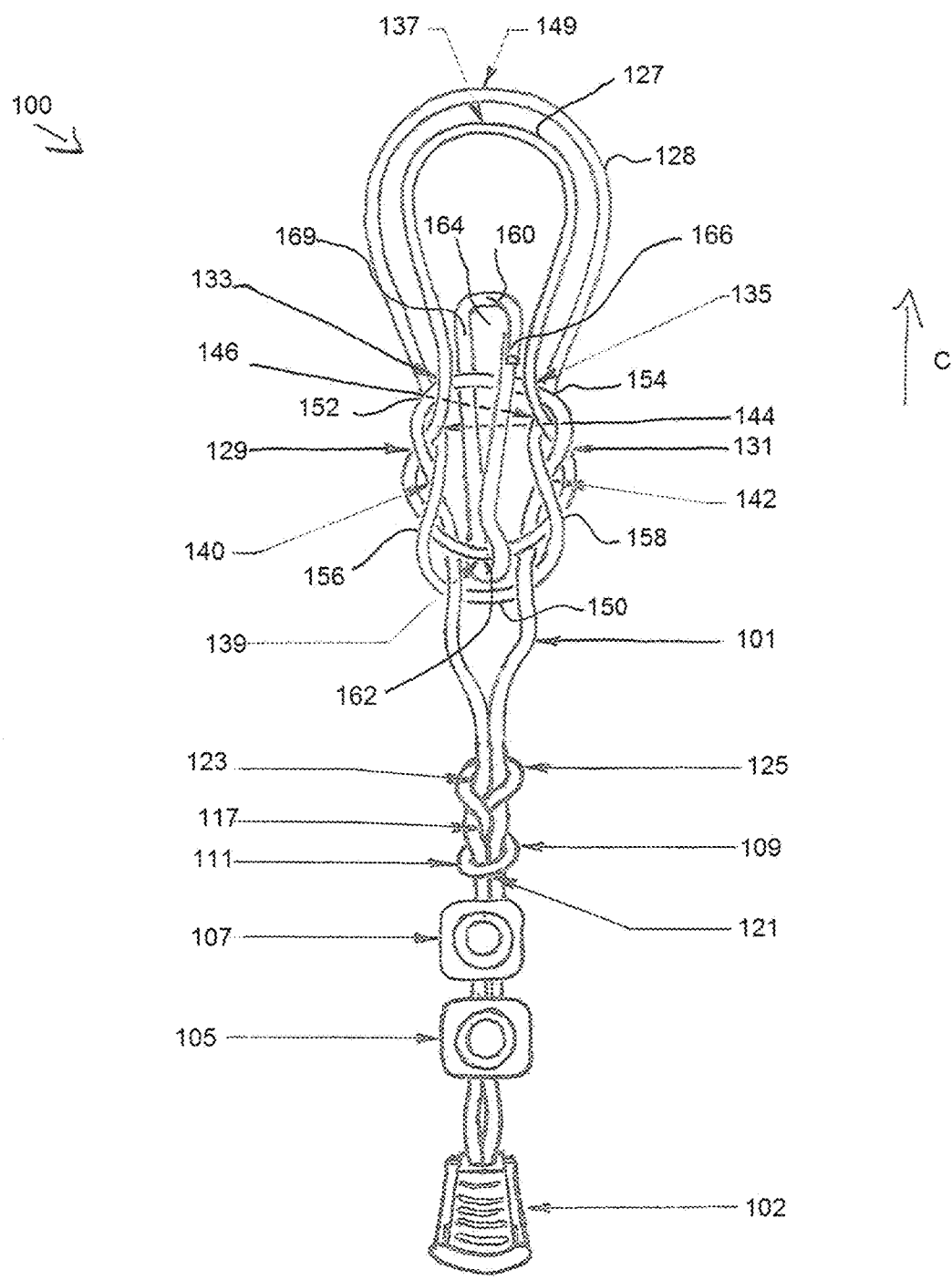
FIG. 7 is a front view of the device of FIG. 1.
Figure 8:
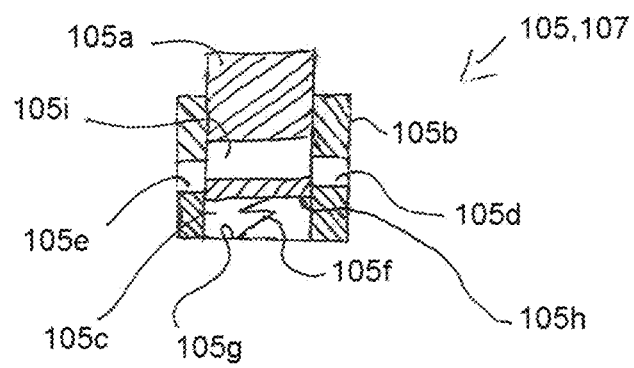
FIG. 8 is a side section view of a stop mechanism of the device of FIG. 1 taken along line 8-8 of FIG. 4.

FIG. 7 shows the device 100 comprising a third elastic loop 128. A loop-to-loop connection is made between cord 101 and loop 128. The loop 128 is placed over a portion of the loop 127 and cord 101 so that the same passes through the loop 128. A proximal end 150 of loop 128 is under a portion of the portions 101a, 101b as shown in FIG. 7. The loop 128 then extends over portions of portions 101a, 101b at first set of crossing locations 140, 142. Then the loop 128 extends under cord 101 adjacent the distal end 103 at a second set of crossing locations 152, 154. The loop then extends out and around the distal end 137 of loop 127. Before crossing over cord 101 at the first crossing locations 140, 142, the loop 128 crosses loop 127 at a third set of crossing locations 156, 158. The loop extends under and again crosses loop 127 at a fourth set of crossing locations 144, 146.

In some embodiments, a portion of the third elastic loop 128 is drawn through the opening 104 in the cord 101 in a direction opposite of the direction that a portion of the second loop was drawn through the opening 104 in the cord 101 to create the corresponding loop-to-loop connections with cord 101. Therefore, if the portion of the second elastic loop is drawn through the opening 104 in the cord 101 from the backside to the face side of the cord 101 as shown in FIG. 6, then the portion of the third elastic loop will be drawn through the opening 104 in cord 101 from the face side to the backside of the cord 101, as shown in FIG. 7. In some embodiments, the interconnection of the third loop 128 with the second loop 127 and cord 101 creates an interlocking tuck loop.

The device 100 comprises an attachment implement, such as a hook 160. In some embodiments, the hook is a closed hook having a base open area 162 and an upper open area 164 opposite the base opening area. A narrow portion 163 separates the base open area 162 from the upper open area, but the narrow portion may be open sufficient to allow the cord 101 or loop 127, 128 to pass between the base open area and the upper open area 164. Segments of the hook 160 overlap at an overlap 166. The hook can be opened by pressing the lower segment 168 toward the rear segment 169 to open a gap between the lower segment 168 and an upper segment at the overlap 166. The hook can be opened and the proximal end 139 of loop 127 moved into upper open area 164 and then into the base open area 162. The hook can also be opened to receive the distal end 103 of the cord 101. The distal end 103 of the cord 101 may, at least initially be in the upper open area 164, and then moved into the base open area 162.

In some embodiments, the hook is an open hook rather the closed or closable hook shown. In some embodiments, a magnet can be used in place of or in addition to the hook. In some embodiments, other attaching implements can be used in place of or in addition to the hook.

FIG. 1 shows the article 50 has been placed through the opening 104 between cord portions 101a, and 101b of cord 101. The hook 160 has been pulled up in the direction C of FIG. 7 and the second and third elastic loops 127, 128 are drawn down in the directions A, and B of FIG. 1, respectively, around the sides of the article 50. The elastic loops 127, 128 extend around and against second side 52 of the article 50 opposite of the first side 54 of the article 50. The elastic loops 127, 128 may be arranged in a diverging fashion as shown in FIG. 1 to increase lateral stability and grip of the held article 50.

A portion 128a of the loop 128 extends between the bottom of the hook 160 and the held article 50, as shown in FIG. 1. The portion 128a provides a contact buffer between the hook 160 and the held article 50. The portion 128a also operates to grip the held article 50. Opposite of portion 128a about the article is the first elastic loop 118. The first elastic loop 118 can contact the side 52 of the article 50 to assist in the gripping and holding of the article 50. The device 100 allows a users to hold, mount, or hang the article by the hook 160, magnet, or other attaching implement.

To remove the article 50, in some applications or embodiments, the user can withdraw the article from the cord 101 and the loops 127, 128 laterally in the directions D or E of FIG. 1. In the alternative, the user may like to release loops 127 and 128 from engagement with the article by moving them around the sides 56, 58 in the directions opposite of directions A and B, respectively. Then the user can withdraw the article 50 from the cord 101 by moving it in the directions D or E, or by moving the device 100 or cord 101 in the directions D or E relative to the article 50, or both.

In some embodiments, loop 118 is not used and the stop mechanism 105 or 107 provides adjustment, friction, and sizing about the article 50.

FIG. 9 shows a second embodiment article retaining device 170. The same labels from device 100 will be used in device 170 where the elements are the same between the two embodiments. The device 170 comprises the cord loop 101, the opening 104 in cord 101, the fourth elastic loop 118, the hook 160, and a fifth elastic loop 172. The fifth elastic loop 172 is connected to cord 101 in the same manner that the fourth elastic loop 118 is connected to cord 101. Therefore, the fifth elastic loop 172 is joined with a loop-to-loop connection to cord 101. The locations of the loops 118 and 172 along the length of the cord are user adjustable, as it is with loop 118 of device 100. An article can be placed within the cord on the distal side of loop 172 in area 104a. The loops 118, 172 may be moved along cord 101 to provide the desired grip or fit around the article 50. An article can be placed between portions 101a and 101b at location 104c between loops 118 and 172. The loops 118, 172 can be placed along the length of the cord 101 to provide the desired fit or grip around the article 50. An article can be placed between portions 101a and 101b at location 104d below loops 118 and 172. The loops 118, 172 can be placed along the length of the cord 101 to provide the desired fit or grip around the article 50.

In some applications or embodiments, the article 50 is a phone, a portable electronic device, a battery, a power pack, a battery charger, a food container, a bag of chips, a pair of shoes, an article of clothing, a water bottle, a baby bottle, or the like. Therefore the device 100 can be configured for or used to grip a variety of articles. Further, the device 100 can be used to gather or connect multiple loose articles, such as cord segments.

The hook 160, magnet or other attaching implement can be used to connect the article 50 to a variety of places and objects, such as, an article of clothing, a kitchen cabinet, a vehicle such as a car or bicycle, among many other deployments. When it is used to connect to an article of clothing, one exemplary attachment location is a pocket or belt loop of pants or shorts. In some embodiments, one or more of the elastic loops described here in comprises a stretchable rubber.

From the foregoing, it will be observed that numerous variations and modifications may be effected without departing from the spirit and scope of the invention. It is to be understood that no limitation with respect to the specific apparatus illustrated herein is intended or should be inferred. For example, one or more component or embodiments may be combined, modified, removed, or supplemented to form further embodiments within the scope of the invention. As a further example, steps provided could be carried out in a different order to achieve desired results. Further, steps could be added or removed from the processes described. Therefore, other embodiments and implementations are within the scope of the invention.

The invention claimed is:

1. An article retaining device, comprising:
    an elongated first loop comprising a first end and a second end;
    a hook joined to the first loop at the second end;
    an elastic second loop joined to the first loop and to the hook; and,
    an elastic third loop joined to the first loop;
    the second loop is joined to the first loop by a first loop-to-loop connection; the third loop is joined to the first loop by a second loop-to-loop connection; and,
    a portion of the second loop extends through a loop opening of the first loop from a backside to a face side of the first loop to form the first loop-to-loop connection, and wherein a portion of the third loop extends through the loop opening of the first loop from the face side to the backside of the first loop to form the second loop-to-loop connection.

2. The device of claim 1, comprising a stop mechanism; the first loop comprises a first cord portion and a second cord portion; the stop mechanism joins the first cord portion and the second cord portion at or adjacent the first end of the first loop.

3. The device of claim 2, wherein the stop mechanism releasably grips the first cord portion and the second cord portion to prevent movement of the stop mechanism relative to the first cord portion and the second cord portion.

4. The device of claim 3, wherein the stop mechanism is a first stop mechanism, and the device comprising a second stop mechanism, the first stop mechanism comprising a spring biased cord gripping mechanism, the second stop mechanism comprises an elastic fourth loop.

5. The device of claim 1, comprising a cord joining mechanism, the first loop comprises a cord comprising a cord first end and a cord second end, the cord joining mechanism joins the cord first end to the cord second end to form the first loop.

6. The device of claim 1, comprising a fourth elastic loop that is joined to the first loop by a third loop-to-loop connection, wherein the fourth elastic loop is a friction agent adjacent the second end.

7. The device of claim 1, wherein
    the first end is a first loop first end;
    the second end is a first loop second end;
    the first loop comprises a pair of first loop segments extending between the first end and the second end of the first loop;
    the second loop comprises a second loop first end;
    the second loop comprises a second loop second end;
    the second loop comprises a pair of second loop segments extending between the second loop first end and the second loop second end; and,
    the second loop is joined to the first loop by the first loop-to-loop connection
    wherein
        the first loop first end and the second loop second end are opposite of each other, the first loop second end constrains a portion of the pair of first loop segments, and, the second loop first end constrains a portion of the pair of second loop segments.

8. The device of claim 7, wherein the third loop comprises a third loop first end;

the third loop comprises a third loop second end;

the third loop comprises a pair of third loop segments extending between the third loop first end and the third loop second end; and, the third loop is joined to the first loop by the second loop-to-loop connection wherein the first loop first end and the third loop second end are opposite of each other, the first loop second end constrains a portion of the pair of first loop segments, and, the third loop first end constrains a portion of the pair of third loop segments.

9. A phone holder, comprising an elongated first loop configured to receive a phone;

a connection implement joined to the first loop;

an elastic second loop joined the first loop with a first loop-to-loop connection;

an elastic third loop joined to the first loop with a second loop-to-loop connection;

the first loop and the second loop are connected to the connection implement;

the second loop and the third loop are configured to extend around and grip the phone; and, a portion of the second loop extends through a loop opening of the first loop from a backside to a face side of the first loop to form the first loop-to-loop connection, and wherein a portion of the third loop extends through the loop opening of the first loop from the face side to the backside of the first loop to form the second loop-to-loop connection.

10. A method of connecting an article, comprising the steps of:

joining an elastic second loop to an elongated first loop by interlocking the second loop to the first loop wherein drawing the first or second loop away from an other of the first or second loops causes a connection between the first and second loop to tighten;

joining an elastic third loop to the first loop;

joining a hook to the first loop and the second loop;

placing the article within the first loop;

stretching the second loop around the article;

stretching the third loop around the article; and, connecting the hook to an external object to join the article to the external object.

11. A method of claim 10, wherein the steps of stretching the second loop around the article and stretching the third loop around the article comprise the step of stretching the second loop and the third loop about the article such that the second loop and the third loop diverge from each other.

12. The method claim 10, wherein the step of placing the article within the first loop further comprises the step of securing a stop mechanism to two cord segments of the first loop adjacent the article and opposite of the hook to grip the article between the stop mechanism and the hook.

13. The method of claim 10, wherein the step of joining the elastic second loop to the elongated first loop comprises the step of forming a loop-to-loop connection between the first loop and the second loop.

14. The method of claim 10, wherein the step of joining the elastic second loop to the elongated first loop comprises the step of forming a first loop-to-loop connection between the first loop and the second loop; the step of joining the elastic third loop to the first loop comprises the step of forming a second loop-to-loop connection between the first loop and the third loop.

15. The method of claim 10, comprising the step of, before the step of joining the elastic second loop to the elongated first loop, joining an elastic fourth loop to the elongated first loop by forming a loop-to-loop connection between the first loop and the fourth loop.

\* \* \* \* \*